United States Patent Office 3,388,731
Patented June 18, 1968

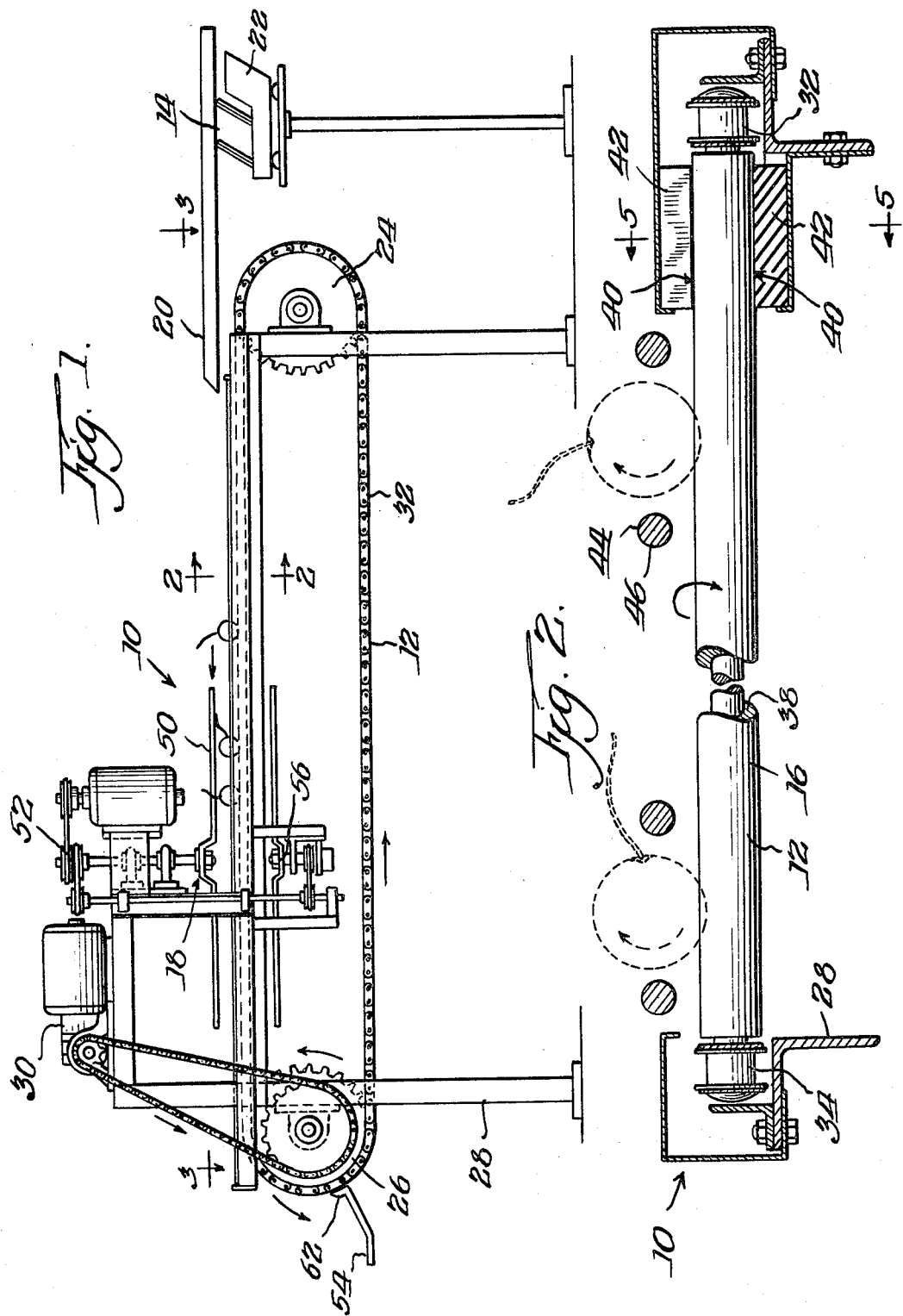

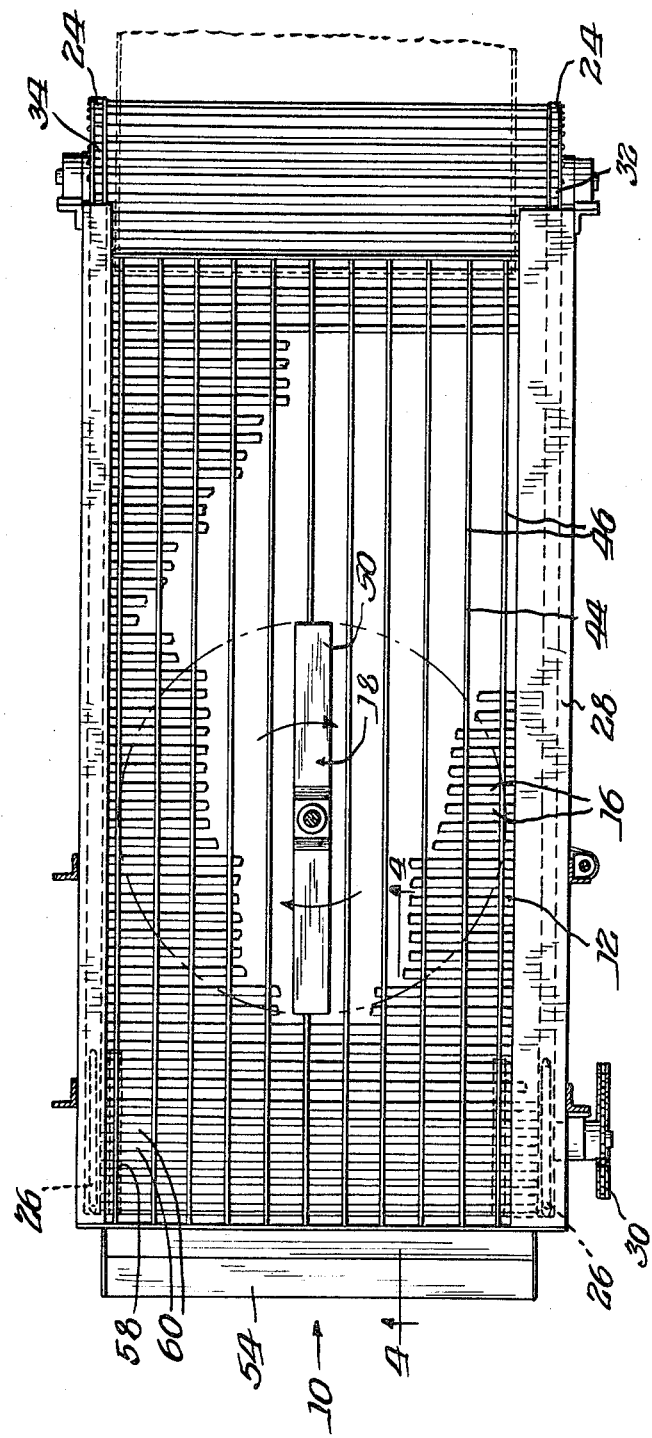
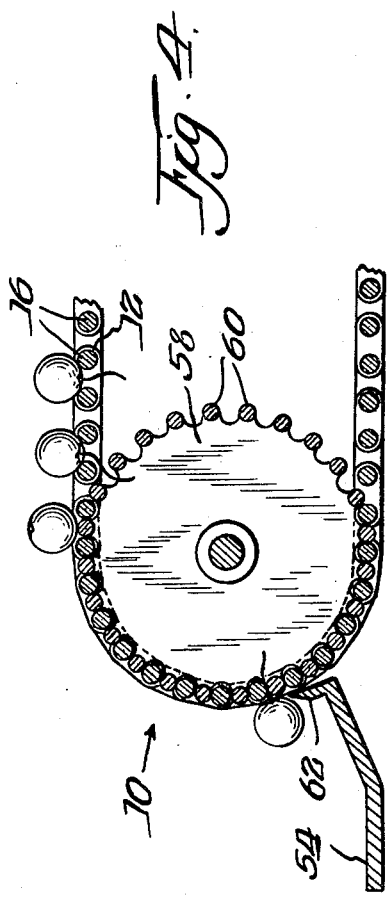

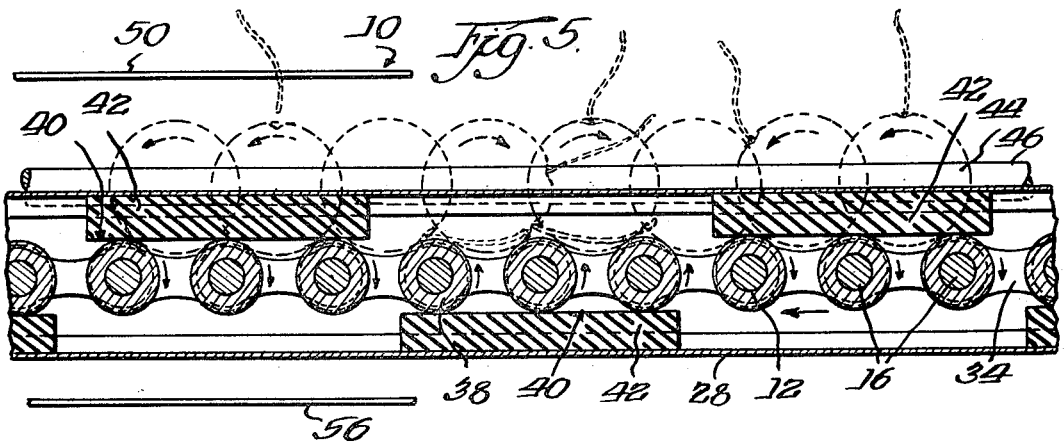
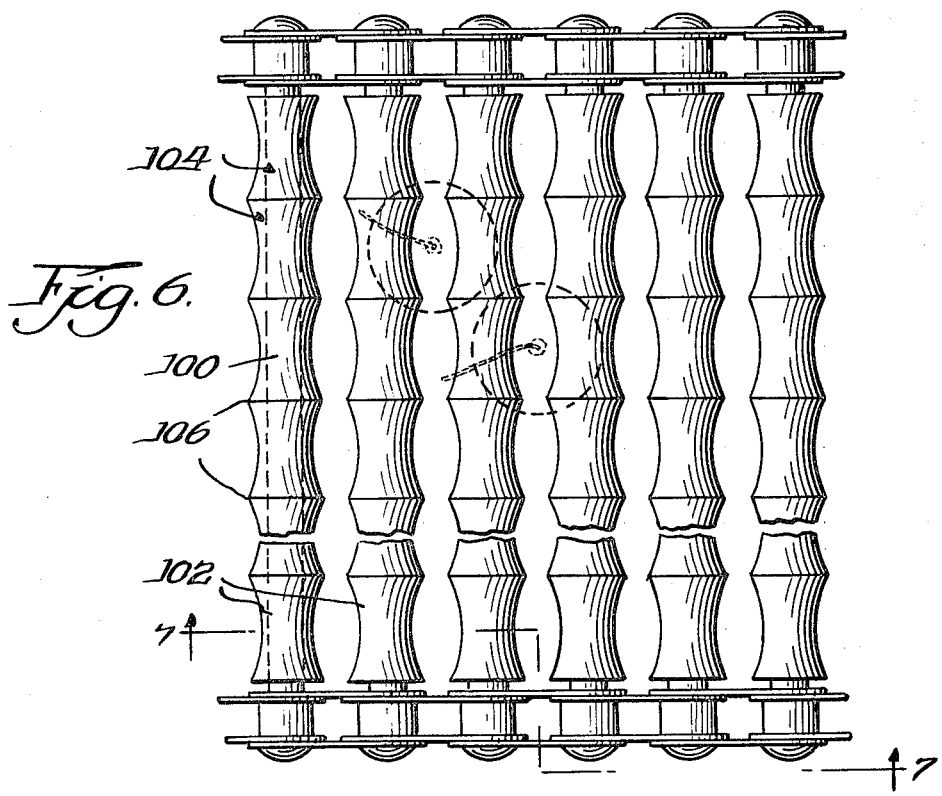
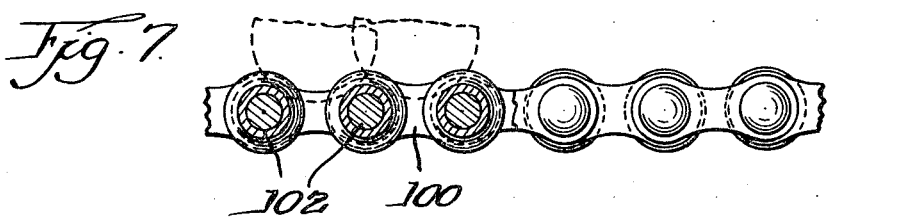

3,388,731
FRUIT STEM REMOVAL
Lawrence B. Reisterer, Dee Bruce Ranger, and Alan E. Weber, Kalamazoo, Mich., assignors to Libby, McNeill & Libby, Chicago, Ill., a corporation of Maine
Filed Feb. 17, 1966, Ser. No. 528,183
8 Claims. (Cl. 146—238)

ABSTRACT OF THE DISCLOSURE

Apparatus having an endless conveyor with a plurality of parallel elongated rollers which are axially rotated periodically in opposite directions for rotating stem-containing fruit thereon, and a member driven to traverse the rollers for removing the fruit stems by impact therewith. Also, a method of removing fruit stems by rotating stem-containing fruit in a plane while allowing the fruit stems to become oriented in this plane, and pulling the stems out from the fruit.

---

The present invention relates to the removal of stems from stem fruits such as cherries and more particularly to novel apparatus and methods for removing such stems.

It is a general object of the present invention to provide new and improved apparatus and methods for removing the stems from cherries or the like prior to processing.

It is another object of the invention to provide new and improved apparatus and methods for fruit stem removal which provides a more efficient and reliable stem removal, with reduced stem breakage and minimum fruit injury.

It is a more specific object of the invention to provide a low cost and low maintenance apparatus which will accept randomly oriented stem bearing fruit and will automatically orient and remove the stems.

It is a further specific object of the invention to provide an improved method of fruit stem removal by manipulation of the fruit to achieve a common orientation of the stems coincident to their removal.

Further objects and features of the present invention pertain to the particular arrangements, structures and operations whereby the above identified and other objects of the invention are attained.

The invention both as to its method and means will be better understood by reference to the following specification and the drawings forming a part thereof wherein:

FIGURE 1 is a side view of an exemplary cherry stemming machine in accordance with the present invention;

FIGURE 2 is a cross-sectional view taken along the line 2—2 of FIG. 1;

FIGURE 3 is a cross-sectional view taken along the line 3—3 of FIG. 1;

FIGURE 4 is a cross-sectional view taken along the line 4—4 of FIG. 3;

FIGURE 5 is a cross-sectional view taken along the line 5—5 of FIG. 2;

FIGURE 6 illustrates an alternative embodiment of the conveyor means for the apparatus in FIG. 1 and FIGURE 7 is a cross-sectional view taken along the line 7—7 of FIG. 6.

Turning now to the drawings, there is shown therein an exemplary cherry stemmer machine 10 in accordance with the present invention. The machine 10 has an endless conveyor 12 onto which randomly oriented cherries are placed by an input feed apparatus 14. The endless conveyor 12 carries a multiplicity of spaced transverse rollers 16. The rollers 16 are rapidly axially rotated in a periodically reversing rotation, as will be further explained hereinafter, so that the cherries thereon are rapidly rotated in a single plane of rotation as they are carried along the conveyor 12. The motion imparted to the cherries automatically provides upright positioning of the stems during the passage of the cherries under a stem knock-out mechanism 18, which strikes the stems and removes them from the cherries.

The input feed apparatus 14 may be any suitable or conventional feed mechanism. There is illustrated herein a simple in-feed trough 20. The trough 20 may be vibrated by, for example, a syntron vibrator 22 so as to insure even feeding. It will be noted that the in-fed cherries at this point have their stems intact thereon and have a completely random stem orientation.

It may be seen from FIG. 3, for example, that the conveyor 12 preferably extends over the full width and length of a machine frame or cable 28. The endless conveyor 12 preferably includes suitable conventional drive chains 32 and 34 at opposite sides thereof supported between opposing pairs of sprocket wheels 24 and 26. The sprocket wheel pairs are mounted respectively at opposite ends of the machine frame 28. The pair of sprocket wheels 26 may be driven by a suitable conventional driving mechanism such as an electric motor and chain drive arrangement 30. Preferably the conveyor 12 is driven at a steady speed as, for example, 40–80 feet per minute. The direction of movement is away from the input feed apparatus 14 and along the length of the table toward and under the knock-out mechanism 18. The knock-out mechanism 18 is preferably mounted near the end of the table 28 opposite the input feed apparatus 14.

Preferably the rollers 16 extend between each of the opposing links of the drive chains 32 and 34 respectively. The parallel multiplicity of rollers 16 extending transverse the conveyor 12 define the fruit carrying surface. An exemplary outside diameter for the rollers 16 for cherries is 9/16 inch. Even spacing is provided between adjacent rollers sufficient to allow relative rotation without engagement and to allow stems to pass freely therebetween. However the spacing is substantially less than the diameter of the smallest cherries to be processed. The rollers 16 are preferably cylindrical with a covering sleeve 38 of formica or other suitable material defining the exterior surface thereof. The exterior surface should be suitable for engaging the cherries without injury thereto yet provide sufficient frictional engagement between the rollers and the cherries to enable the rotation of the cherries by the rollers.

Each roller 16 is preferably freely axially rotatably mounted at each end of the drive chains. Thus the rollers 16 are all moved together as a part of the endless conveyor 12 and maintain the same position with respect to one another, yet each roller is free to be independently axially rotated.

A suitable structure for accomplishing the desired rotation of the rollers 16 is provided by successively engaging the exterior surfaces of the rollers 16 by a plurality of alternating frictional driving surfaces 40 positioned to engage the rollers. It may be seen that the driving surfaces 40 are provided by a sequence of blocks 42 of rubber or other suitable material alternately spaced above and below the conveyor 12 at at least one edge along the upper flight thereof. The block 42 may be fixed in any suitable manner to the machine frame 28. The blocks 42 do not overlie one another but are spaced so that as each individual roller 16 is moved along the machine it will engage a driving surface 40 on its underside for a period, and then as it continues to move it will engage another driving surface 40 on its upper side, and so on in a repeated sequence. Each engagement of the roller 16 with a driving surface 40 causes a positive rotation of the roller 36 in one direction as long as the roller remains in contact with that driving surface. Engagement of the same roller by the next driving surface on the opposite side thereof causes rotation of the roller in the opposite direction. Accordingly it may be seen that each roller is caused to be axially rotated with a periodically reversing direction of rotation. The speed of rotation of the rollers 16 is quite rapid and is a function of the forward speed of the conveyor and the small diameter of the rollers. For example, with an appropriate roller diameter of 9/16 inch and an appropriate conveyor speed of 40 feet per minute the roller speed of revolution speed would be approximately 270 r.p.m.

It will be observed that completely overlying the endless conveyor 12, evenly spaced thereabove, is a guide screen 44. The screen 44 preferably comprises parallel smooth stationary rods of for example 1/4 inch in diameter, extending longitudinally the full length of the machine.

The rods 46 forming the screen guide 44 are preferably laterally spaced apart by a distance somewhat greater than the diameter of the largest fruit to be stemmed. Accordingly the cherries poured onto the rollers 16 by the input feed apparatus 14 are formed into even longitudinal lines between each adjacent pair of rods 46. The rods 46 restrict the lateral movement of the cherries as they are moved along by the conveyor 12, i.e., they are prevented from wandering laterally across the conveyor. The rods 46 space the cherries laterally from one another and prevent the movements of one cherry from interfering with the movements of a laterally adjacent cherry. However, being sufficiently spaced and smooth the rods do not themselves prevent or interfere with the rotation of the cherries. Another advantage of the rods is to eliminate a requirement of leveling the rollers. Preferably the rods 46 are evenly spaced above the rollers 16 by approximately 3/8 to 1/2 inch so that they are approximately level with the center of the cherries.

The manipulation of the rollers 16 provides a manipulation of the cherries which results in substantially all of the cherry stems being upright at some time during the passage of the conveyor 12 under the stem knock-out mechanism 18. Such stem knock-out mechanisms have been previously known but were not fully effective due to the fact that a large percentage of the cherries passing the knock-out mechanism had their stems inclined to the horizontal to such an extent that stem removal was not accomplished.

The method of cherry stem orientation described herein insures that at some time during the movement of the cherries past the knock-out mechanism the stems will be projected upwardly toward the knock-out mechanism and thus be removed. Referring to FIGURES 2 and 5 in particular, it may be seen that each cherry normally rides between two adjacent rollers 16. The cherry, being generally spherical, makes a point contact with each of the two rollers. The two points of contact are in line along the longitudinal axis of the machine, i.e., in the direction of the movement of the conveyor 12. Thus the cherry is restrained from longitudinal movement with respect to the conveyor 12 but is free to self-rotate in the lateral plane, i.e., the plane perpendicular the longitudinal axis of the machine.

As may be clearly seen from FIGURE 5, the driving surfaces 40 which operate the rollers are sufficiently elongate to insure that as two adjacent rollers 16 pass over that particular driving surface 40 both rollers will be simultaneously rotated in the same direction for at least a complete rotation. Accordingly both rollers 16 exert a unidirectional rotational force upon the cherry between the two rollers. This rotational force is exerted solely in a plane perpendicular the rollers and along the aforementioned line defined by the points of contact with the cherry. This rotation is rapid, but the degree of rotation is restricted by the fact that the cherry can rotate only until the stem rotates into engagement with one of the two rollers. At that point the cherry rotation stops and the further rotation of the rollers merely results in rollers slipping against the surface of the cherry. However, by virtue of the above-described means for frequently periodically reversing the direction of rotation of the rollers, the rotation of the cherry is continued. As the pair of rollers carrying the cherry engage the next driving surface 40, they are both now rapidly rotated in the opposite direction, thus causing the cherry to rotate in the same plane as before but in a reversed direction. Again, the cherry rotates until the stem now hits the opposite one of the pair of rollers. Accordingly it may be seen that the motion of the cherry is a rapid back-and-forth sequence of approximately one-half revolution rotations. However, the overall or average effect is that of the cherry being subjected to a considerable period of rapid rotation throughout the time in which the cherry is carried down the endless conveyor 12 to the knock-out mechanism 18. It will be noted that the same rotational effect will also be provided even if for some reason the cherry is resting upon only a single roller 16 rather than between two adjacent rollers.

The cherries having been placed on the rollers 16 with a random stem orientation, most of the cherries will have their stems above the rollers but oriented away from the vertical by some degree, as the cherry at the left-hand side of FIG. 2. In the following discussion these cherries will be considered first. Only a very small percentage of the cherries will land on the rollers oriented with their stems pointed downward between the rollers, since this is only a small angular portion of the 360 degrees of possible stem orientation. Also, the rods 46 also tend to increase the percentage of cherries which land on the endless conveyor 12 with their stems above the rollers 16 rather than extending downwardly therebetween.

As each cherry is rapidly rotated within a vertical longitudinal plane as described above, a substantial centrifugal force is exerted upon the cherry stems, since they are relatively heavy and extend substantially from the center of rotation of the cherry. This centrifugal force acts upon the cherry stems to urge the stems to move toward the plane of rotation of the cherry. This movement is permitted by the above described freedom of the cherries to rotate laterally. Accordingly as the cherries are forcibly rotated by the rollers 16 in one plane the cherries are self-rotated by the centrifugal force of the fruit stem in a second plane perpendicular the first plane until the stems are approximately in the first plane. The substantial length of the conveyor 12 preceding the stem knock-out mechanism 18 provides a sufficient number of the back and forth rapid rotations of the cherries to accomplish this automatic alignment of the stems. Thus as the cherries pass under the knock-out mechanism 18, the cherries have their stems oscillating back and forth in a vertical plane longitudinally the direction of the movement of the conveyor. Accordingly, at the mid-point of each cherry oscillation the stem is extending directly perpendicularly from the conveyor 12 toward the knock-out mechanism, and is thus at the best position for stem removal.

Considering next the stem knock-out mechanism 18, it will be appreciated that the invention is not limited to the specific stem removal mechanism shown, and that the stem alignment means and methods described herein are applicable for employment with other types of stem removal mechanisms. However the high speed rotary knock-off member described herein is preferred. This is particularly so in view of the fact that the fruit stem bond strength is at a minimum when the stem is separated from the cherry in a direction perpendicular the stem axis. It may be seen that the disclosed stem knock-out mechanism 18 accomplishes stem removal at this optimum angle.

The stem knock-out mechanism 18 preferably has a rotating blunt edge bar or blade 50 which is mounted evenly spaced above the rollers and driven to rapidly traverse over the rollers. Preferably the bar 50 has a length approximately corresponding to the width of the conveyor 12 so that as it rotates it sweeps the entire width of the conveyor. The bar 50 is rotated at a high speed, for example, 17,000 r.p.m. The rotary drive for the bar 50 may be provided by a conventional electric motor and belt drive arrangement 51 mounted to the machine frame 28. The bar 50 is preferably mounted to rotate in a horizontal plane and spaced from the rollers 16 a distance slightly greater than the largest diameter of the cherries which are to be stemmed. This insures that the bar 50 does not come in contact with the body of the cherries.

As the bar 50 rotates, the blunt edges of the bar strikes the cherry stems perpendicular to the stems. The removal of the stems is accomplished solely by the high speed impact of the bar against the stems, and relies only upon the greater mass of the body of the cherry as compared to the stem to retain the cherry while the stem is removed. There is no physical holding of the body of the cherry while the stem is pulled out. Thus abrasion, bruising, and other damage to the cherry is eliminated. Stem breakage is also greatly reduced. To provide added insurance of the removal of all possible stem additional rotating bars 50 may be provided in series so that the cherries may pass under more than one rotating bar.

After the stems have been removed the de-stemmed cherries continue on to the end of the conveyor 12 where they may be collected in a discharge trough 54. The space between adjacent rollers 16 being considerably greater than the stem thickness of the cherries, the stems removed by the knock-out mechanism 18 are free to fall downwardly through the conveyor 12 and be removed. An additional feature which may be provided, but which for clarity is not shown here, is a housing or cage overlying the bar 50 to detain any flying stems and to prevent injury to personnel from the rotating bar.

Generally only less than five percent of the cherries are oriented on the conveyor 12 with the stems projecting downwardly through the rollers 16 and thereby do not have their stems removed as described above. However, means are preferably provided for removing these downwardly projecting stems also. One means which may be provided is an additional stem knock-out mechanism 56 which operates in the same manner as the stem knock-out mechanism 18, but is spaced beneath the rollers 16 rather than above them. It may be driven by a conventional power take off from the same electric motor and belt drive 52.

A preferred means for positive removal of all downwardly projecting stems prior to the discharge of the cherries from the machine is provided by the meshing rod stem trapping arrangement illustrated in FIGURE 4. The rear pair of sprocket wheels 26 preferably has fixed co-axially therebetween a cylindrical rod drum 58. The rod drum 58 comprises an evenly circumferentially distributed assembly of rods 60 being approximately the same length as the rollers 16. The rods 60 have a diameter and radial spacing such that they evenly mesh with the rollers 16 by closely fitting in the spaces between the rollers. Preferably only approximately 1/50 of an inch clearance is provided. Accordingly as each rod 60 enters the space between an adjacent pair of rollers 16 wherein a cherry stem projects, the stem is caught between the rod 60 and one of the rollers. As the rod drum 58 and the rollers 16 rotate in intermeshed engagement around the axis of the sprocket wheels 26 the cherry body is carried into engagement with a knock-off or scraper 62, which may be the lip of the discharge trough 54. The scrapper 62 is spaced very closely to the rod drum 58 and catches under the cherry body. As the conveyor 12 then continues to move past the scrapper 62 the stem is pulled away, allowing the cherry to fall into the discharge trough 54. Then as that portion of the drum rod 60 disengages from the conveyor 12 the stem is free to drop out of the conveyor.

Considering FIGURES 6 and 7 there is shown therein a conveyor 100 which is an alternative embodiment for the conveyor 12. The conveyor 100 has rollers 102 corresponding generally in configuration and function to the rollers 16, but differing in that the rollers 102 are fluted, i.e., they have a plurality of annular flutes or depressions 104 therein. The flutes 104 enable the elimination of the rods 46 by providing the lateral separation means for the cherries on the rollers 102 themselves. It may be seen that the flutes 104 of adjacent rollers 102 longitudinally align and have dimensions such that a single cherry is accommodated between each adjacent pair of flutes. The annular ridges or shoulders 106 between the flutes 104 prevent lateral movement of the cherries and space the cherries laterally apart. The center of the flutes 104 provides the greater distance between adjacent rollers 102 and accordingly the lowest point at which the cherry may ride. Accordingly each cherry is urged toward the center of the flutes 104.

It is clear that there is disclosed here a new and improved means and methods for stem orientation and stem removal from stem bearing fruits. While the means and methods described herein are presently considered to be preferred, it will be appreciated that numerous variations and modifications within the purview of those skilled in the arts may be made, and it is intended to cover in the appended claims all such variations and modifications as fall within the true spirit and scope of the invention.

What is claimed is:
1. A fruit stem removing machine comprising:
   a multiplicity of parallel elongate spaced rollers, said rollers being adapted to rotate fruit thereon,
   means for rapidly axially rotating said rollers with a periodically reversing direction of rotation,
   and stem engaging means spaced above said rollers for removing the stems from the fruit on said rollers.
2. A fruit stem removing machine comprising:
   fruit conveyor means,
   means for moving said conveyor means,
   a multiplicity of elongate spaced rollers transverse said conveyor means and moving therewith, said rollers being adapted to carry fruit thereon,
   means for rapidly axially rotating said rollers with a periodically reversing direction of rotation,
   and stem removal means spaced above said rollers for removing the stems from the fruit on said rollers.
3. The fruit stem removing machine of claim 2 wherein said means for rapidly axially rotating said rollers comprises a plurality of spaced driving surfaces alternately engaging opposite surfaces of said rollers.
4. The fruit stem removing machine of claim 2 wherein said stem removal means comprises a stem knock-off member spaced from said rollers and mounted and driven to rapidly traverse over said rollers.
5. The fruit stem removing machine of claim 2 having guide means thereon for laterally spacing apart fruit on said rollers.
6. A method for removing the stems from stem-containing fruit comprising the steps of:
   spacing the stem containing fruit apart,
   subjecting said fruit to rapid rotation in a first plane while allowing each said fruit to be self-rotated by the centrifugal force on its stem in a second plane perpendicular to said first plane until the stems are approximately in said first plane,
   then pulling the stems out from the fruit.
7. The method for removing the stems from stem-containing fruit of claim 6 wherein the stems are pulled out from the fruit by rapidly striking the stems approximately perpendicular thereto.

8. The method for removing the stems from stem-containing fruit of claim 6 wherein said rapid rotation of said fruit in a first plane is a plurality of rapid partial revolutions of said fruit in an alternatingly reversed direction of rotation.

References Cited

UNITED STATES PATENTS 2,048,470  7/1936  Sanborn _____ 146—55

JAMES M. MEISTER, *Primary Examiner.*